P. A. EMANUEL.
ELECTRIC CELL.
APPLICATION FILED DEC. 10, 1915.
1,190,880.
Patented July 11, 1916.
2 SHEETS—SHEET 1.
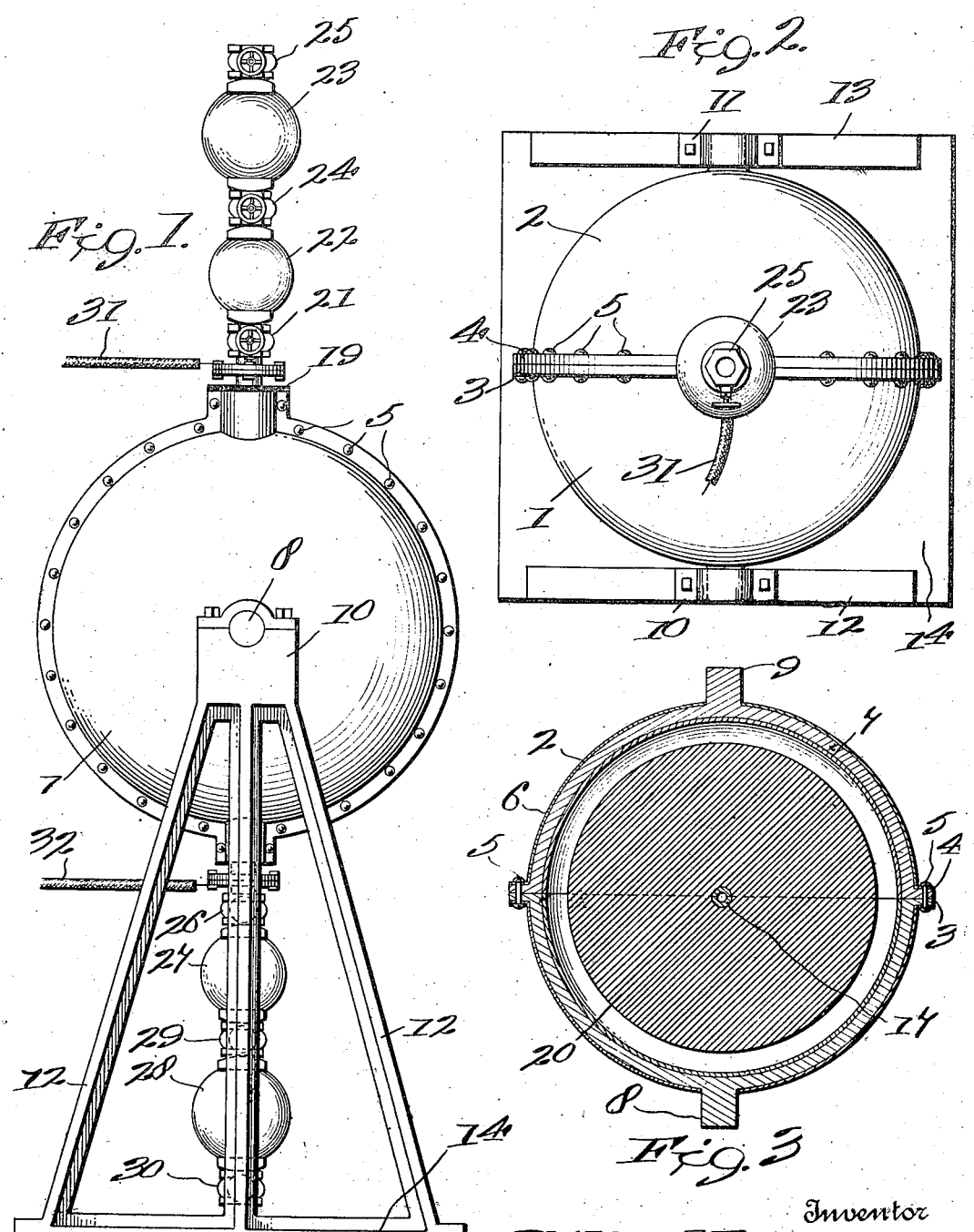
Witnesses
Edwin J. Beller
R. J. Mathinney
Inventor
Philip A. Emanuel,
by Wilkinson, Guesta & MacKaye,
Attorneys

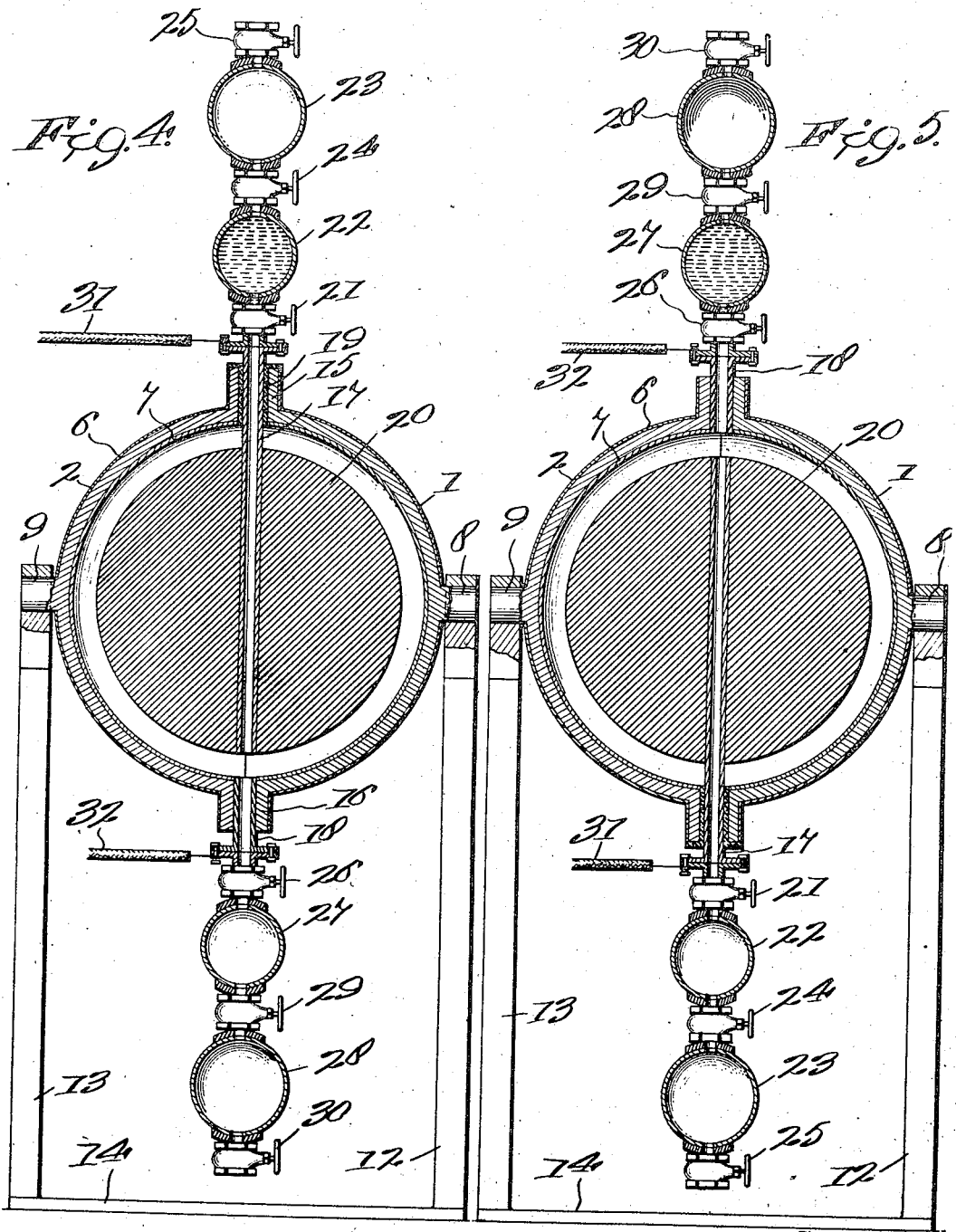

UNITED STATES PATENT OFFICE.

PHILIP A. EMANUEL, OF AIKEN, SOUTH CAROLINA.

ELECTRIC CELL.

1,190,880.  Specification of Letters Patent.  Patented July 11, 1916.

Application filed December 10, 1915. Serial No. 66,156.

*To all whom it may concern:*

Be it known that I, PHILIP A. EMANUEL, a citizen of the United States, residing at Aiken, in the county of Aiken and State of South Carolina, have invented certain new and useful Improvements in Electric Cells; and I do hereby declare the following to be a full, clear, and exact description of the invention, such as will enable others skilled in the art to which it appertains to make and use the same.

My present invention relates to improvements in electric cells and methods of operating the same, and consists in the constructions, combinations, arrangements and steps herein described and claimed.

It is an object of my present invention to provide an improved electric cell capable of regeneration, and adapted for use in submarines without giving off any noxious or disagreeable gases.

Another object of the present invention resides in providing an improved electric cell wherein the negative electrode will be of aluminum for coöperation with an alum or double sulfate to recover aluminum during the regeneration of the improved cell.

In the accompanying drawings forming a part of this application, and in which similar reference symbols indicate corresponding parts in the several views: Figure 1 is a side elevational view of an improved cell constructed in accordance with the present invention. Fig. 2 is a top plan view of the same. Fig. 3 is a central horizontal sectional view taken through the cell. Fig. 4 is a vertical sectional view of the improved cell in position for operation; and Fig. 5 is a similar view of the improved cell inverted for regeneration.

Attention is called to my copending application Serial No. 59838, filed November 5, 1915, and entitled "Improvements in electric batteries," in which a somewhat similar structure and method of operation and regeneration is set forth.

Referring now in detail to the drawings, 1 and 2 designate hemispherical sections assembled together to provide an outer and substantially spherical container; said sections being constructed along their free edges with flanges 3 and 4, respectively, for receiving bolts 5 through which the sections are secured together, as advantageously disclosed in Figs. 1 and 2.

The outer container, so built up of the sections 1 and 2, is covered with an insulating material 6, preferably glass enamel, while the interior of the container, which is advantageously of steel is coated with platinum, as indicated at 7; the outer container thus described, constituting the positive electrode of my improved cell.

The sections 1 and 2 of the container are provided respectively with trunnions 8 and 9 received in bearings 10 and 11 on standards or supports 12 and 13 erected on a base 14, whereby the cell is mounted for inversion, as will more particularly hereinafter appear.

At the upper and lower ends of the container the sections 1 and 2 are formed with semi-cylindrical extensions which when assembled constitute necks 15 and 16 for providing bearings for pole-pieces 17 and 18, respectively, the negative pole-piece 17 being insulated from its neck 15 by a gasket of insulating material or a coating of glass enamel 19. The pole-piece 17 extends within the container and is secured to a central duct within the negative electrode 20, which is advantageously a solid spherical block of zinc or aluminum.

Above the cell pole-piece 17 is flanged to connect with a similar flanged end of a valve casing 21, to which is, in turn, connected a receptacle 22 for containing the electrolyte, which may be such an acid salt as hydrogen sodium sulfate, $NaHSO_4$, or the normal salt together with sulfuric acid, $H_2SO_4Na_2SO_4$.

The receptacle 2 is connected to a similar receptacle 23 through a valve casing 24, controlling communication between said vessels, and admission to the vessel 23 is under the control of a valve 25, through which the depolarizer, such, for instance, as gaseous oxygen, may be admitted.

The positive pole-piece 18 is in electric connection with the platinum lining 7, and passes through the neck 16, where it is flanged to be coupled with a valve casing 26 having a similar flanged end. Receptacles 27 and 28 are connected to the valve casing 26 and are in communication with each other through a similar valve casing 29, the remote receptacle 28 being provided with a valve 30 for controlling admission of a depolarizer thereto with which the receptacles 27 and 28 are charged during the operation of the battery, and which depolarizer may be under pressure or not, as desired. Leads 31, 32, are connected to the pole-pieces and are adapted to be joined to form the external circuit or to include any apparatus upon which it is desired to furnish current, as will be understood.

The operation of the improved cell may be conducted in the following manner: Referring to Fig. 4, a suitable electrolyte, such as the acid salt or normal salt and sulfuric acid, are introduced within the receptacle 22, the valve 21 being initially closed. This electrolyte may be introduced through the upper receptacle 23 by opening the valves 24 and 25. After the receptacle 22 has been charged, valve 24 is closed, and a depolarizer under pressure is introduced within the tank 23 through the valve 25, which is subsequently closed. Similarly, in the lower vessels 27 and 28 gaseous oxygen, or such other depolarizer as may be found desirable or convenient to use, is introduced into the same through the respective valves. The battery is now in condition for operation when the external circuit, through the leads 31 and 32, is closed.

To start the battery into operation the valve 26 is initially closed, preventing the depolarizer in the receptacles 27 and 28 from ascending through the positive pole-piece 18 and into the closed cell above. The valve 21 is opened, permitting the electrolyte in the vessel 22 to descend through the negative pole-piece 17 and through the duct in the negative electrode 20 within the cell, where it circulates between the interior spherical wall of the outer container and the outer surface of the negative electrode 20. The valve 24 may be simultaneously opened with the valve 21, or the same may be opened only after a quantity of the depolarizer has been delivered to the cell. By opening the valve 24 the tank 23 is placed in communication with the battery, and the depolarizer under pressure therein becomes mixed throughout the electrolyte and forces the same down into the interior of the cell, placing the latter under pressure. The external circuit being closed, the electrolyte will become decomposed within the cell where it is maintained under pressure, and the same, or its resulting salt and water, will not be permitted to escape through the positive pole-piece 18 owing to the fact that the valve 26 is kept tightly closed. The pressure under which the battery is so maintained will induce better electrolytic action, and will be productive of an increased voltage in ratio to the degree of pressure under which the battery is placed and maintained.

As soon as any weakening of the current intensity is felt in the external circuit, the valve 21 is closed, and the valve 26 may be then opened to permit the salt, evolved from the union of the metal of the negative electrode 20 with the radical $SO_4$ and the water formed by the union of the freed hydrogen with the oxygen of the depolarizer at the positive electrode, to descend and be forced downwardly through the positive pole-piece 18 and into the receptacle 27; where, being of greater specific gravity, will displace the depolarizer therein, causing the same to ascend within the cell, where it operates to assist in forcing the salt and water therein out of the cell and also adds its assistance to the depolarizer from the upper tank 23 in removing the hydrogen from the platinized face of the positive electrode. It will be understood that the valve 29 may be also opened to permit the salt and water to descend within the vessel 28 and also displace the depolarizer therein.

After sufficient quantity of the accumulated salt has been removed from the cell, the valve 26 is again closed, and subsequently the valve above, 21, opened to permit the electrolyte and depolarizer under pressure to descend within the cell, where the same will quickly raise the pressure therein and the action of the cell will be proceeded with, it being found that the current of the external circuit will readily pick up and remain normal until the action having gone on for some time the cell will again become congested with the salt and water evolved from the electrolytic action, and the operation of closing the valve 21 and opening the valve 26 to permit removal of the same will be accomplished in the above described manner. The cell will then be periodically relieved of its salt, and during the operation of the same the valve 26 will be kept tightly closed to insure a relatively high degree of pressure within the inclosed outer container composed of the sections 1 and 2.

The improved cell so constructed and operated, is for submarine use preferably provided with a negative electrode 20 which is made of aluminum, and the electrolyte in the tank 22 is preferably an acid salt, such as above set forth, or sulfuric acid and a neutral salt. When such elements are used, the acid salt, for instance, will be dissociated in the cell, the radical $SO_4$ and water seeking the negative electrode 20 where the same will form a sulfate and together with the salt of the electrolyte which, as above described, may be bisulfate of sodium, will form an alum or double salt. The oxygen from the receptacle 23 will combine with the hydrogen evolved from the bisulfate of sodium, and will form water in which the double sulfate will be carried. The reaction in the battery will be substantially as follows:

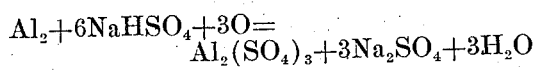

The double sulfate is from time to time, in the above described manner, collected through opening the valve 26 in the receptacles 27 and 28 or either one of the same, and after the electrolyte in the tank 22 and the depolarizer under pressure in the receptacle 23 have become exhausted, the battery is then revolved from the position shown in Fig. 4 to the inverted position shown in Fig. 5, and the operation of regeneration may be accomplished in the following manner: The double sulfate is collected in the receptacle 27 in Fig. 5, the valve 26 being initially closed. The receptacle 28 above the vessel 27 is now charged with gaseous hydrogen under pressure and the valve 30 thereafter closed. Similarly, the vessels beneath the cell, 22 and 23, are charged with gaseous hydrogen which is also preferably under pressure, and the valve 21 is closed tightly before the operation is commenced.

To start the regeneration process, the valves 26 and 29 above, are opened, permitting the salt or double sulfate to be forced from the vessel 27 by the hydrogen under pressure from the vessel 28 through the positive hollow pole-piece 18 and into the interior of the cell, placing the latter under pressure. An external source of current being connected to the leads 31 and 32, the passage of the current from the steel or external container to the negative electrode 20, which is preferably of aluminum, decomposes the salt or double sulfate in accordance with the following formula:

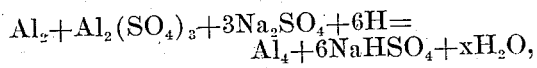

the first term, $Al_2$, of this formula being the negative electrode 20.

It will thus be seen that from the salt or double sulfate the aluminum is recovered, the same being plated on the negative electrode 20. The bisulfate of sodium is also recovered by unison of the hydrogen of the vessel 28 with the radical $SO_4$ of the decomposed salt or double sulfate, and a quantity of water is also produced.

After the electrolytic action has been permitted to continue for some time, the valve 26 above is closed and the valve below, 21, is opened to permit the bisulfate of sodium dissolved in the water to be removed to either or both vessels 22 and 23, and the acid salt will there displace the hydrogen which will ascend within the cell and operate to force down the remainder of the salt therein, thus effectually clearing the cell. After the cell has become thus cleared, the valve 21 is again closed and the upper valve is opened, permitting another charge of the salt or double sulfate and hydrogen to be introduced to the cell, where dissociation will be accomplished and the products removed as above described.

After the hydrogen and salt have become exhausted and the bisulfate all collected in the lower vessels, the device is revolved again about its trunnions 8 and 9 to the initial upright position shown in Fig. 4, and after removing the acid salt to the receptacle 22 and charging the other receptacle with oxygen or other depolarizer, the apparatus is again in readiness for operation.

It is obvious that those skilled in the art may vary the details of construction and arrangements of parts without departing from the spirit of my invention, and therefore I do not wish to be limited to such features except as may be required by the claims.

I claim:

1. An improved electric cell including a spherical container constituting one electrode thereof, and a spherical electrode located within said spherical container and spaced circumferentially therefrom, substantially as described.

2. An improved electric cell including an outer hollow substantially spherical container constituting the positive electrode, and a solid spherical negative electrode supported substantially centrally within said container and insulated therefrom substantially as described.

3. An improved electric cell including an outer substantially spherical and hollow container constituting one electrode, and a solid substantially spherical negative electrode supported within said container and provided with a duct therein for introducing the electrolyte, substantially as described.

4. An improved electric cell of the character described including an outer substantially spherical and hollow container constituting one electrode, a solid substantially spherical second electrode of lesser diameter within the interior of said container and provided with a substantially central duct therethrough, a hollow pole-piece connected to support said inner electrode and communicating with the duct therein to deliver the electrolyte to the space within said container and between the electrodes, substantially as described.

5. An improved electric cell of the character described including an outer substantially spherical container composed of hemispherical sections assembled together and constituting the positive electrode, a solid substantially spherical negative electrode supported centrally within said container and having a central duct therein, a hollow pole-piece supported in said container and connected to said negative electrode in alinement with the duct therein, and means for supplying an electrolyte through said hollow pole-piece and duct, substantially as described.

6. The combination of a container constituting one electrode of an electric cell, a negative electrode supported within and insulated from said container and having a central duct therein, a hollow pole-piece connected to support said negative electrode and in communication with the duct therein, a receptacle connected to said hollow electrode for containing the electrolyte, and a second receptacle in controllable communication with said first-named receptacle for containing a depolarizer, substantially as described.

7. In an electric cell, the combination of a container constituting the positive electrode, a negative electrode supported within said container and having a duct therein, a hollow pole-piece mounted in said container and connected to support the inner negative electrode, said pole-piece being in communication with the duct therein, a receptacle connected to said hollow pole-piece, an electrolyte in said receptacle, valve means controlling communication between said receptacle and the cell, a second receptacle, a depolarizer under pressure in said second receptacle, and valve means controlling communication between said receptacles, substantially as described.

8. In an electric cell of the character described comprising an outer substantially spherical receptacle constituting the positive electrode, an inner substantially spherical and solid negative electrode traversed by a duct, a hollow pole-piece mounted in said container and connected to support the inner electrode in spaced relation therefrom, said pole-piece being in communication with the duct therein, a plurality of communicating receptacles connected to said hollow pole-piece for containing one an electrolyte, and a second a depolarizer, a hollow pole-piece connected to the positive electrode, and a plurality of receptacles in communication with said positive pole-piece and for containing additional depolarizer, substantially as described.

9. In an electric cell, the combination of an outer substantially spherical container constituting the positive electrode, an inner solid electrode having a duct therethrough, a hollow pole-piece mounted through said container and connected to support said inner electrode and being in communication with the duct therein, a pair of communicating receptacles in communication with said hollow pole-piece, an electrolyte in one of said receptacles, a depolarizer under pressure in the other receptacle, valve means controlling communication between said receptacles and between the same and the interior of the cell, a hollow pole-piece connected to the positive electrode, a pair of receptacles connected to said positive pole-piece and for containing additional depolarizer, and valve means controlling communication between said receptacles and between the same and the interior of the cell, substantially as described.

10. In an electric cell, the combination of an outer substantially spherical container composed of hemispherical sections secured together and constituting the positive electrode, a solid substantially spherical negative electrode having a duct therein, a negative hollow pole-piece connected to support said inner electrode and in communication with the duct therein, a plurality of receptacles connected to the outer end of said negative pole-piece and containing the proximate an electrolyte and the remote a depolarizer under pressure, valve means controlling communication between said receptacles and between the same and the interior of the cell, a hollow positive pole-piece, a plurality of receptacles connected thereof and containing a depolarizer, and valve means for said receptacles, substantially as described.

11. In an electric cell, the combination of an inclosed strong metallic container, a coating of glass enamel applied to the exterior of said container, a metallic lining on the interior of said container constituting one electrode, a substantially spherical second electrode supported within said container and spaced from said metallic lining, and an acid salt electrolyte within the space between said electrodes, substantially as described.

12. In an electric cell, the combination of a substantially spherical metallic container, an enamel coating applied to the exterior of said container, a platinum lining applied to the interior of said container and constituting one electrode, a substantially spherical aluminum electrode supported within said container and of lesser diameter to provide an interior space between the same and said platinum lining, and an acid salt electrolyte within said interior space between the electrodes, substantially as described.

13. In an improved electric cell, the combination of an inclosed strong metallic container, including hemispherical sections assembled together, a coating of enamel applied to the exterior of said container, a platinum lining on the interior of said container constituting one electrode, a solid substantially spherical aluminum electrode supported centrally within said container and being of lesser diameter than the same to provide a space between the electrode, a hollow pole-piece connected to support the aluminum electrode, a vessel connected to said pole-piece, an acid salt electrolyte in said vessel, a second vessel communicating with the first-named vessel, a depolarizer under pressure in said second-named vessel, and valve means between said vessels and between the first-named vessel and the interior of the cell for controlling the passage of depolarizer and electrolyte thereto, substantially as described.

14. In an improved cell of the character described, the combination of a substantially spherical container constituting the positive electrode, an enamel coating applied to the exterior of said container, a platinum lining on the interior of said container, a substantially spherical negative electrode supported within said container and arranged in spaced relation to said platinum lining, and means for introducing an electrolyte to the cell, substantially as described.

In testimony whereof, I affix my signature.

PHILIP A. EMANUEL.